(12) United States Patent
Fried et al.

(10) Patent No.: US 8,516,455 B2
(45) Date of Patent: Aug. 20, 2013

(54) DYNAMIC LOADING OF KERNEL EXTENSIONS

(75) Inventors: Eric Philip Fried, Austin, TX (US); Stephen Bailey Peckham, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 241 days.

(21) Appl. No.: 13/160,043

(22) Filed: Jun. 14, 2011

(65) Prior Publication Data

US 2012/0324484 A1  Dec. 20, 2012

(51) Int. Cl.
 G06F 9/45  (2006.01)
 G06F 9/44  (2006.01)
 G06F 13/00  (2006.01)

(52) U.S. Cl.
 USPC ........... 717/140; 717/162; 717/163; 717/164; 717/165; 717/166; 719/331; 719/332

(58) Field of Classification Search
 None
 See application file for complete search history.

(56) References Cited

U.S. PATENT DOCUMENTS

| | | | | |
|---|---|---|---|---|
| 2002/0174257 | A1* | 11/2002 | Jones et al. | 709/310 |
| 2003/0200529 | A1* | 10/2003 | Beckmann | 717/114 |
| 2006/0080682 | A1* | 4/2006 | Anwar et al. | 719/331 |
| 2007/0038572 | A1* | 2/2007 | Pastorelli et al. | 705/52 |
| 2010/0031256 | A1* | 2/2010 | Hsieh | 718/1 |

OTHER PUBLICATIONS

"Kernel Programming Guide: Kernel Extensions," http://docs.huihoo.com/darwin/kernel-programming-guide/Architecture, Nov. 2006.
"Kernel Programming Guide: Kernel Extension Overview," http://docs.huihoo.com/darwin/kernel-programming-guide/Extend/, Nov. 2006.

\* cited by examiner

*Primary Examiner* — H S Sough
*Assistant Examiner* — Phuong Hoang
(74) *Attorney, Agent, or Firm* — VanLeeuwen & VanLeeuwen; Matthew W. Baca

(57) ABSTRACT

An approach is provided in preparing a dynamically loaded kernel extension. The approach includes compiling a kernel extension program that includes a symbol, such as a function. The symbol is exported from the kernel extension program and a symbol broker that references the exported symbol is compiled. A kernel extension loader library is created with a defined callable symbol that corresponds to the exported symbol. The kernel extension loader library is linked by an external program after compilation of the external program resulting in a compiled external program. The kernel extension loader library dynamically loads the compiled kernel extension program, the compiled symbol broker, and the exported symbol when the defined callable symbol is referenced by during execution of the compiled external program.

25 Claims, 8 Drawing Sheets

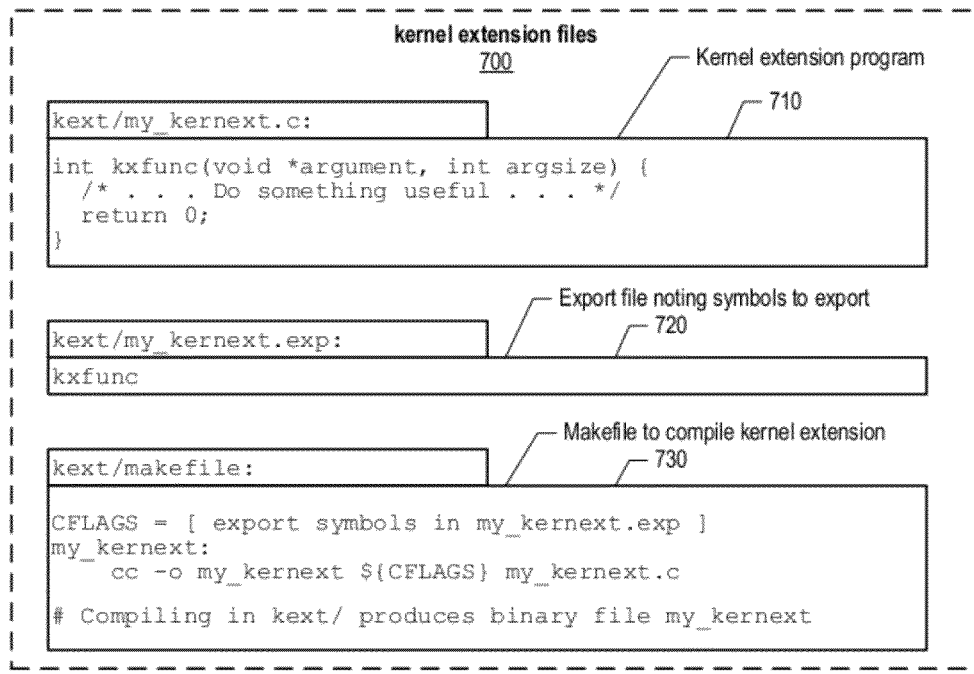
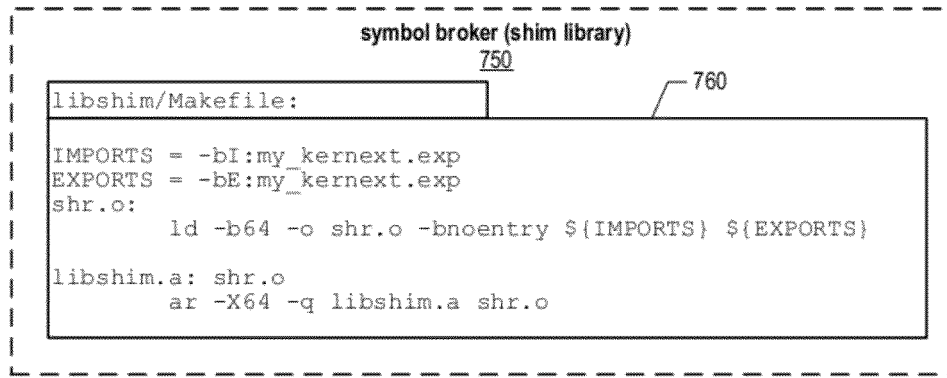
FIG. 7

DYNAMIC LOADING OF KERNEL EXTENSIONS

BACKGROUND

The present invention relates to an approach that dynamically loads a kernel extension in a manner transparent to a calling user program.

The kernel is the central component of most modern operating systems that provides a bridge between applications and hardware-level instruction execution. The kernel typically manages system resources as well as communication between the system's hardware and software components. Kernel extensions, as the name implies, provide extended functionality to a base kernel. In some systems, the kernel extensions can be loaded to a running kernel to add the functionality provided by the extension when the functionality is desired. In addition, these systems often allow the kernel extensions, once loaded, to be unloaded when the functionality is no longer needed. Without loadable kernel modules, an operating system would have to have all possible anticipated functionality already compiled directly into the base kernel. Much of that functionality would reside in memory without being used, wasting memory, and would require that users rebuild and reboot the base kernel every time new functionality is desired. Most modern operating systems supporting loadable kernel modules will include modules to support most desired functionality.

BRIEF SUMMARY

An approach is provided in preparing a dynamically loaded kernel extension. The approach includes compiling a kernel extension program that includes a symbol, such as a function. The symbol is exported from the kernel extension program and a symbol broker that references the exported symbol is compiled. A kernel extension loader library is created with a defined callable symbol that corresponds to the exported symbol. The kernel extension loader library is linked by an external program after compilation of the external program resulting in a compiled external program. The kernel extension loader library dynamically loads the compiled kernel extension program, the compiled symbol broker, and the exported symbol when the defined callable symbol is referenced during execution of the compiled external program.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE SEVERAL VIEWS OF THE DRAWINGS

The present invention may be better understood, and its numerous objects, features, and advantages made apparent to those skilled in the art by referencing the accompanying drawings, wherein:

FIG. 7 is a set of sample kernel extension files and a sample symbol broker.

DETAILED DESCRIPTION

Figure 1:
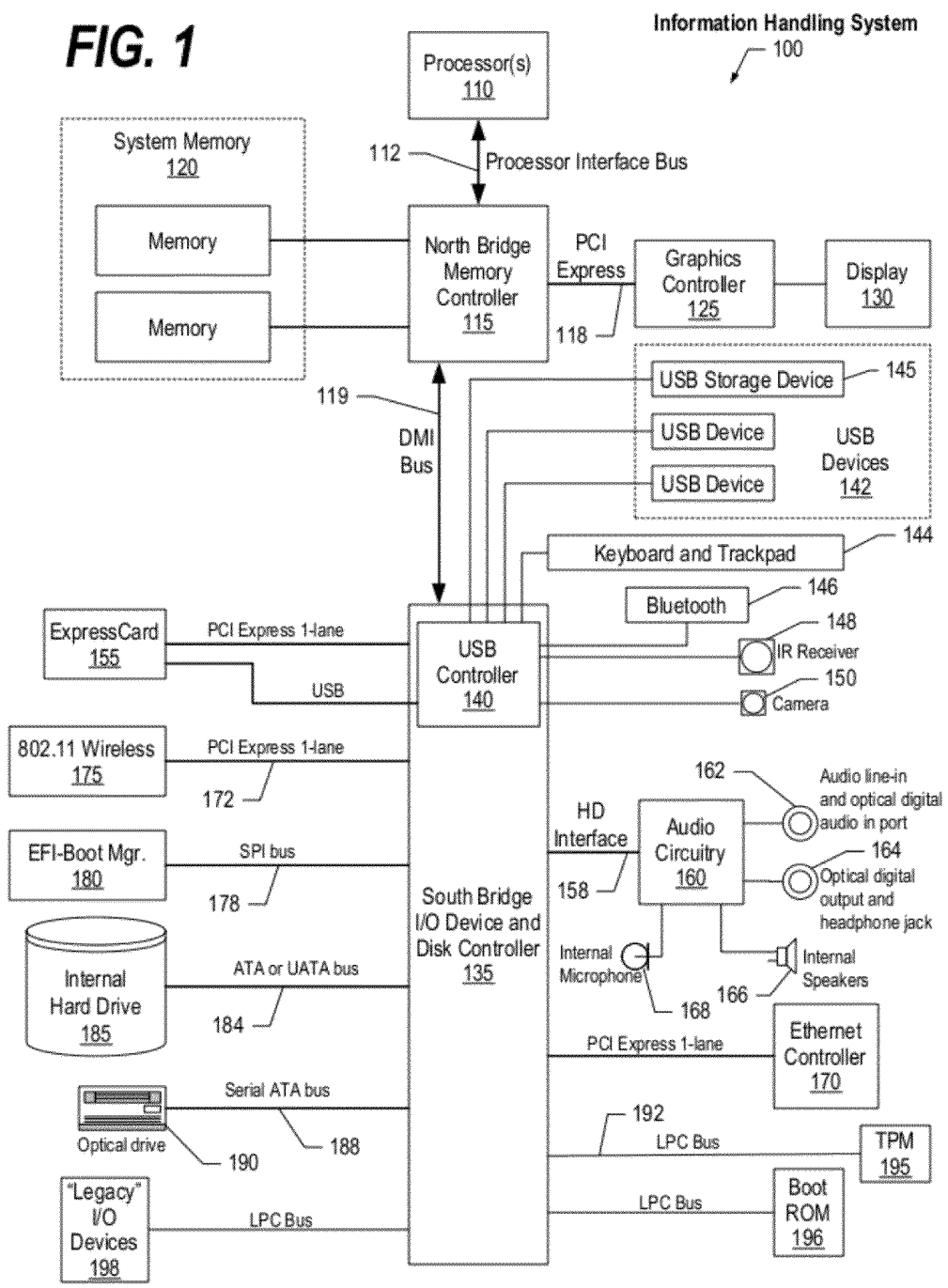
FIG. 1 is a block diagram of a data processing system in which the methods described herein can be implemented.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. However, a computer readable storage medium does not include a propagated signal, such as a carrier wave.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 2:
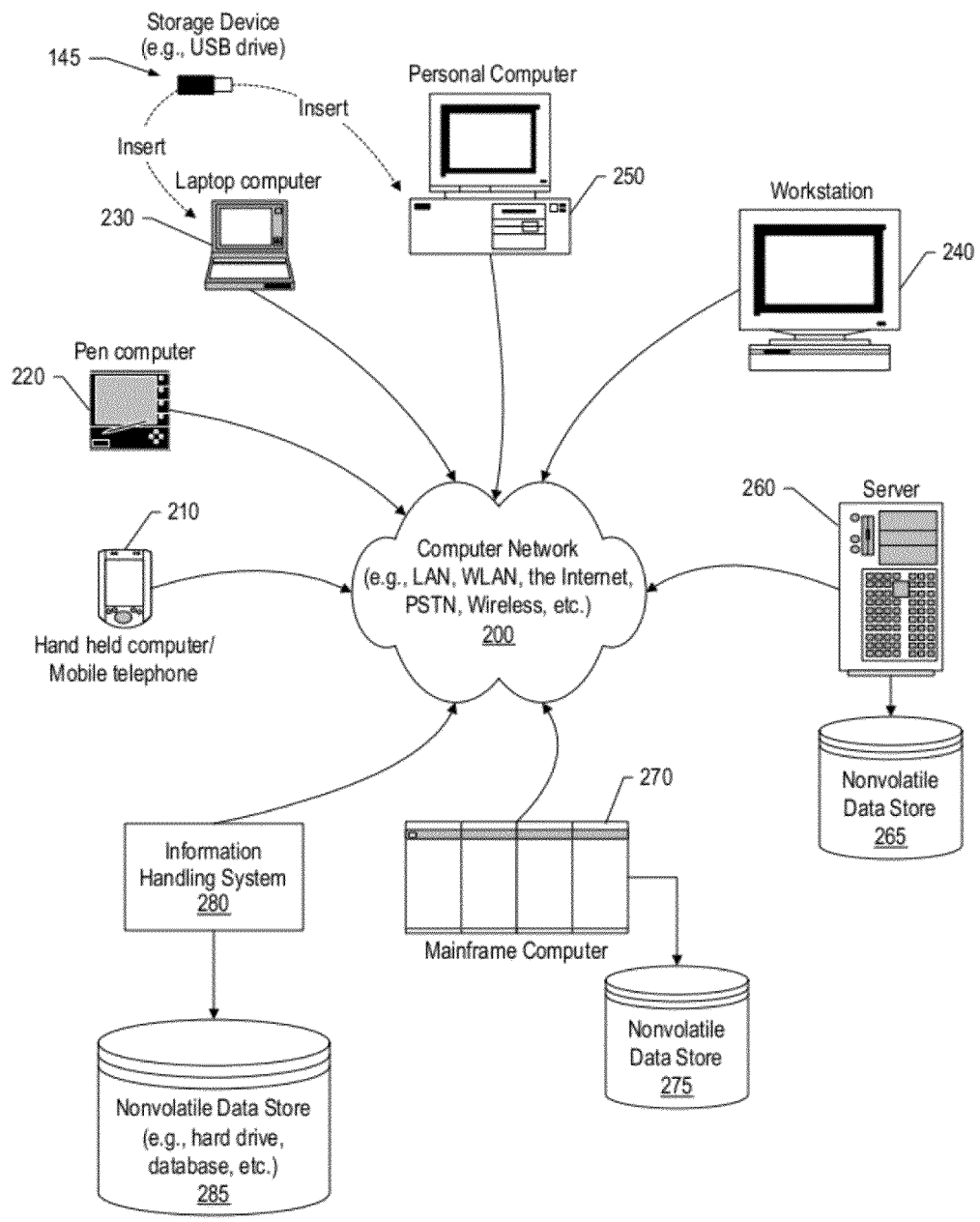
FIG. 2 provides an extension of the information handling system environment shown in FIG. 1 to illustrate that the methods described herein can be performed on a wide variety of information handling systems which operate in a networked environment.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems that operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 2 depicts separate nonvolatile data stores (server 260 utilizes nonvolatile data store 265, mainframe computer 270 utilizes nonvolatile data store 275, and information handling system 280 utilizes nonvolatile data store 285). The nonvolatile data store can be a component that is external to the various information handling systems or can be internal to one of the information handling systems. In addition, removable nonvolatile storage device 145 can be shared among two or more information handling systems using various techniques, such as connecting the removable nonvolatile storage device 145 to a USB port or other connector of the information handling systems.

Figure 3:
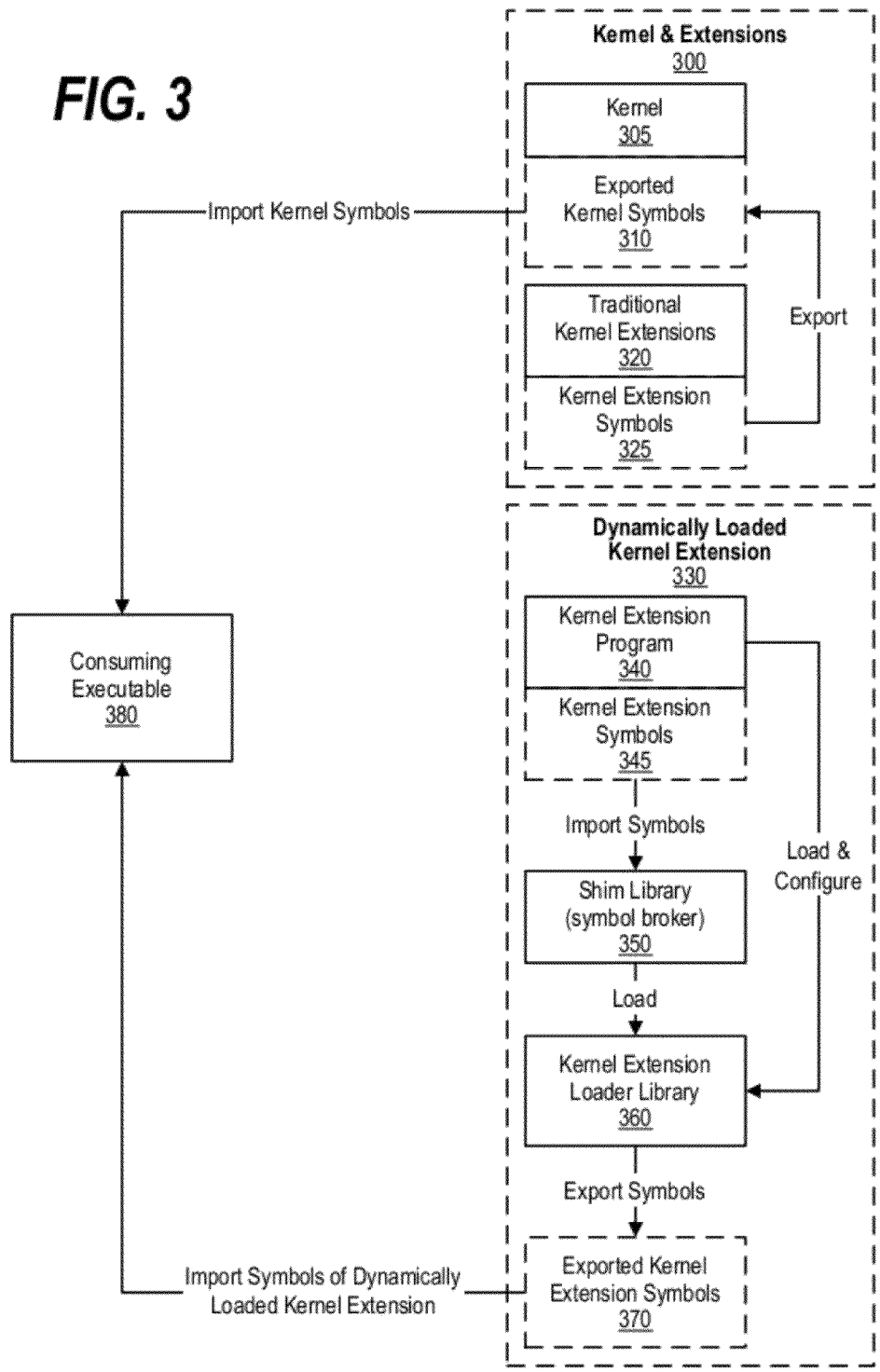
FIG. 3 is a diagram showing interaction between a consuming external program, a kernel with traditional extensions, and a dynamically loaded kernel extension.

FIG. 3 is a diagram showing interaction between a consuming external program, a kernel with traditional extensions, and a dynamically loaded kernel extension. Kernel and extensions 300 depicts base kernel 305 with exported base kernel symbols 310 along with traditional kernel extensions that are utilized by consuming executable 380, such as an external compiled program running in a user space. In addition, traditional kernel extensions 320 and their symbols 325 are loaded into kernel space and symbols 335 are exported to kernel space so that the symbols (e.g., functions, etc.) incorporated in the kernel extension are available to consuming executable 380. Traditional kernel extensions are made available by loading the kernel extensions 320 and exporting their symbols 325 before executing consuming executable 380. However, loading kernel extensions, especially those that might not be called by a consuming executable during a session, unnecessarily consumes resources (e.g., memory, etc.) that could otherwise be used by programs that are executing.

Dynamically loaded kernel extension 330 provides an approach to loading a kernel extension when it is first called by consuming executable 380. Kernel extension program 340 has one or more symbols 345 (e.g., functions, etc.) that are designed for use by consuming executables. The symbols that are designed for use by consuming executables are exported from kernel extension program 340 and imported by symbol broker 350. In one embodiment, symbol broker 350 is a "makefile" that imports the exported symbols from the kernel extension program and exports those same symbols and the symbol broker is compiled with a loader table that creates dependencies between the compiled symbol broker and the symbols exported by the kernel extension. In this manner, if the symbol broker is opened but the kernel extension has not yet been loaded, an error results allowing kernel extension loader library 360 to load a compiled version of kernel extension program 340 (on the fly), load (open) the compiled version of symbol broker 350, and dynamically load the exported kernel extension symbols 345 allowing consuming executable dynamic access to kernel extension program 340 functionality (e.g., functions, etc.). Kernel extension loader library 360 is linked to consuming executable 380 (after the consuming executable has been compiled), allowing the consuming executable with dynamic access to the symbols (functions, etc.) included in kernel extension program 340. Kernel extension loader library 360 exports defined callable symbols (e.g., function names, etc.) that correspond to the exported symbols from kernel extension program 340. In one embodiment, kernel extension loader library includes wrapper functionality that exports the defined callable symbols that are utilized by consuming executable 380. As explained in further detail herein, the kernel extension loader library receives the calls directed to the defined callable symbols, checks to ensure that the kernel extension program is loaded and that the symbol broker is loaded, and loads the exported symbol (function, etc.) included in the kernel extension program. The kernel extension loader library transparently invokes the kernel extension symbol (function, etc.) using the arguments passed from the consuming executable and returns the results to the consuming executable.

Figure 4:
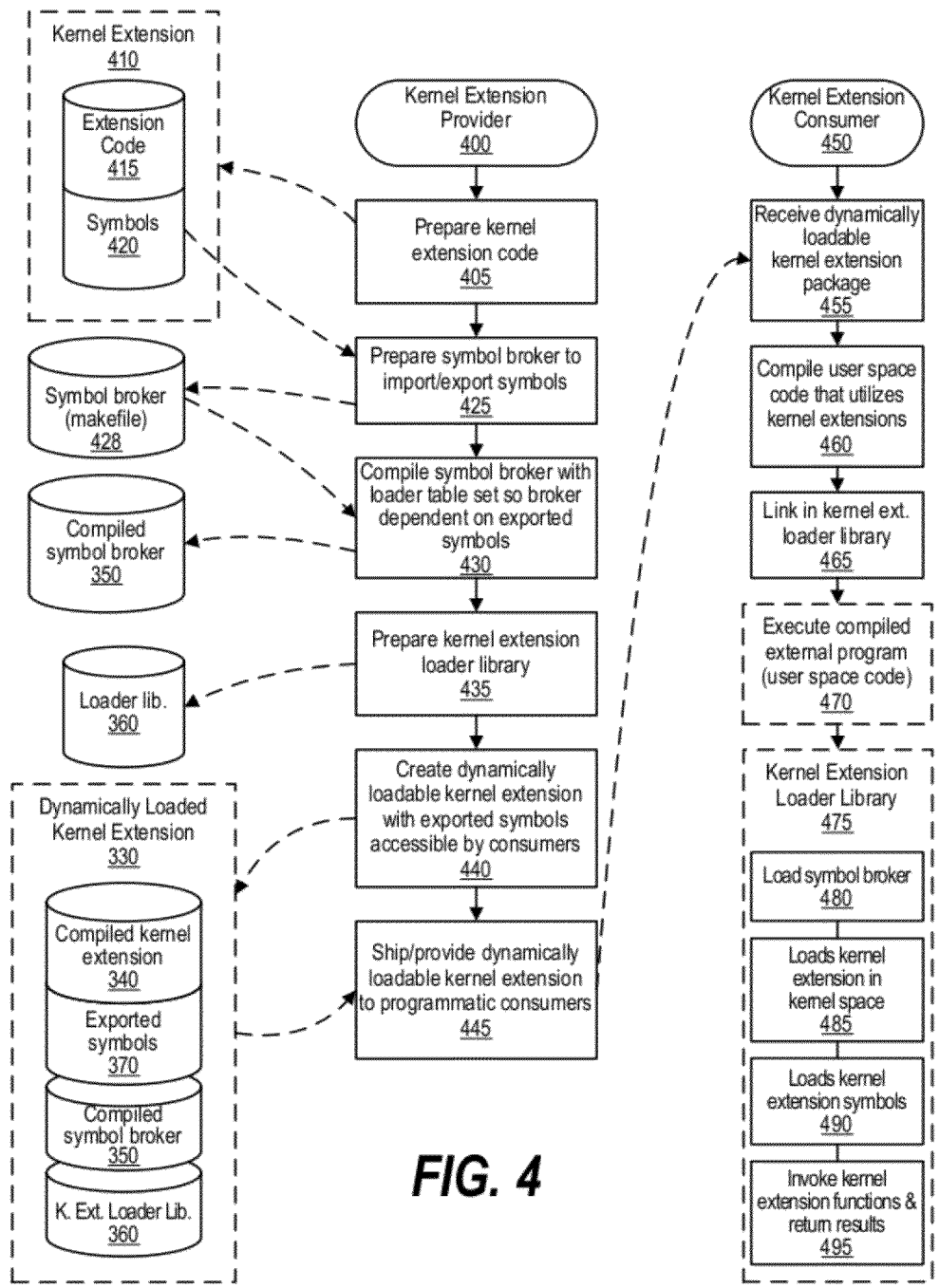
FIG. 4 is a flowchart showing steps taken by the provider of the dynamically loaded kernel extension and the consumer that references functionality provided by the dynamically loaded kernel extension.

FIG. 4 is a flowchart showing steps taken by the provider of the dynamically loaded kernel extension and the consumer that references functionality provided by the dynamically loaded kernel extension. Steps performed by the kernel extension provider are shown commencing at 400 whereupon, at step 405, the kernel extension source code is prepared (e.g., written in a particular program language, etc.). Kernel extension 410 includes both source code 415 as well as one or more exported symbols 420 (e.g., function names, etc.) that allow an external program to utilize (e.g., call) functionality incorporated in extension code 415. At step 425, the kernel extension provider prepares symbol broker source code 428 (e.g., a makefile, etc.) that imports symbols 420 from the kernel extension and exports the same symbols. In addition, the loader table corresponding to the symbol broker indicates that the symbol broker is expecting to identify the exported symbols (at runtime) in kernel space. At runtime, if the kernel extension is not loaded before the compiled version of the symbol broker is loaded, an error results because the expected symbols are not present. The kernel extension loader library checks for this error and dynamically loads the kernel extension when this error occurs before performing another load of the symbol broker. At step 430, the symbol broker source code (e.g., a makefile) is compiled resulting in compiled symbol broker 350. As discussed above, the symbol broker has a loader table that indicates that it is expecting the exported symbols that were exported from the kernel extension program. At step 435, kernel extension loader library 360 is prepared. As described in further detail herein, the kernel extension loader library is linked with a compiled external program (e.g., written by a customer or consumer of the kernel extension, etc.). The kernel extension loader library has a wrapper function that maps defined callable symbols referenced by the compiled external program to the kernel extension's exported symbols and also has a makefile that exports the defined callable symbols so that they can be utilized by the compiled external program. At step 440, the kernel extension provider creates a dynamically loaded kernel extension 330 that has the compiled version of the kernel extension 340, the exported kernel extension symbols 370 (e.g., function names, etc.), the compiled version of the symbol broker 350, and the kernel extension loader library 360 that is linked with the consumer's compiled code. At step 445, kernel extension loader library 330 is shipped (physically or electronically) or otherwise provided to one or more programmatic consumers.

Processing performed by the programmatic consumers is shown commencing at 450 whereupon, at step 455, the consumer receives the dynamically loaded kernel extension package of files. At step 460, the consumer prepares and compiles user space code that utilizes functionality provided by the kernel extension. At step 465, the consumer links the consumer's compiled program (compiled external program) with the kernel extension loader library. In one embodiment, the symbols (e.g., function names, etc.) in the consumer's program actually reference wrapper symbols included in the kernel extension loader library that correspond to the exported kernel symbols. In this manner, when called, the kernel extension loader library can take care of dynamically loading the kernel extension. The consumer's user space code (the compiled external program) is executed at step 470. At some point during execution of the compiled external program, a reference is made to a kernel symbol which invokes kernel extension loader library functionality (step 475). At step 480, the kernel extension loader library loads the symbol broker. If the symbol broker fails to load, indicating that the kernel extension has not yet been loaded, then the kernel extension loader library loads the kernel extension in kernel space at step 485 before loading the symbol broker. At step 490, the kernel extension loader library loads the exported kernel extension symbols and, at step 495, the kernel extension loader library transparently invokes the kernel extension symbol (e.g., a function, etc.) using the arguments passed by the consumer's compiled external program and then returns the results received from the kernel extension back to the compiled external program.

Figure 5:
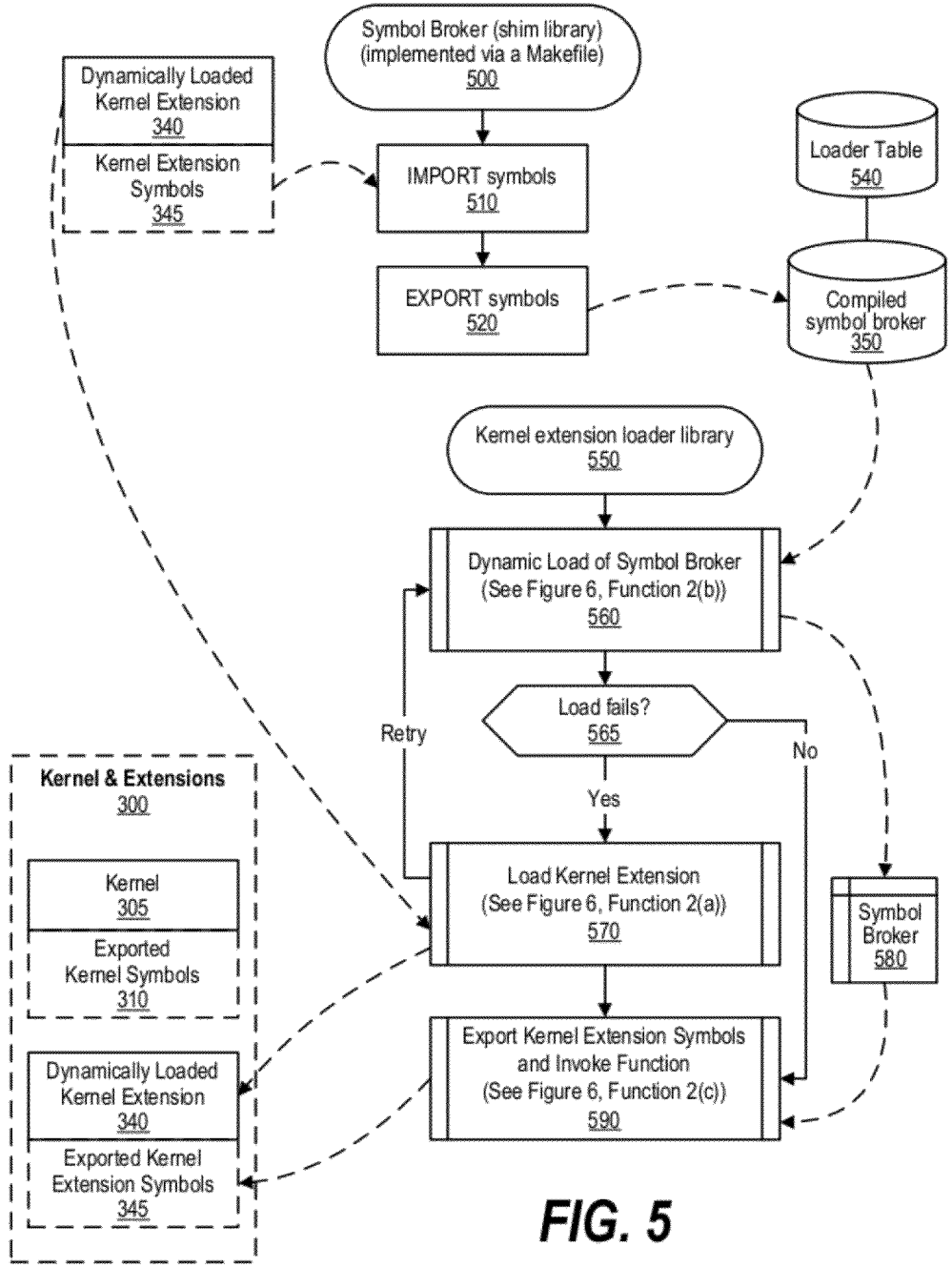
FIG. 5 is a flowchart showing steps taken by a symbol broker library and the kernel extension loader library.

FIG. 5 is a flowchart showing steps taken by a symbol broker library and the kernel extension loader library. Symbol broker 500 is implemented by a makefile. At step 510, the symbols exported by the kernel extension program are imported by the symbol broker. At step 520, these same symbols are exported by the symbol broker. The symbol broker is compiled resulting in compiled symbol broker 350. As previously described, the compiled symbol broker has loader table 540 that indicates that the symbol broker is expecting to find the symbols exported by the kernel extension program in kernel space. Therefore, if the compiled kernel extension is not loaded beforehand, the loading of the symbol broker will generate an error that informs the kernel extension loader library that the kernel extension program needs to be loaded.

Kernel extension loader library processing is shown commencing at 550. The kernel extension loader library is linked in with the consumer's executable (the compiled external program) so that the kernel extension loader library functions are performed. At predefined process 560, the compiled version of symbol broker 350 is loaded (see FIG. 6, function 2(b) and corresponding text for processing details). As previously described, if the kernel extension has not yet been loaded, then the load of the symbol broker will fail. A decision is made as to whether the load of the symbol broker failed (decision 565). If the load failed, then decision 565 branches to the "yes" branch whereupon, at predefined process 570, the kernel extension is loaded (see FIG. 6, function 2(a) and corresponding text for processing details). The loading of the kernel extension results in kernel extension program 340 being loaded in kernel space 300. In addition, once loaded, exported kernel extension symbols can be referenced (e.g., called, etc.). Processing then loops back to predefined process 560 which retries loading the symbol broker (which will succeed now that the kernel extension has been loaded. If the load of the symbol broker does not fail, indicating that the kernel extension has already been loaded, then decision 565 branches to the "no" branch bypassing predefined process 570. At step 590 loaded symbol broker 580 is used to export the kernel extension symbols and invoke the kernel extension function that was requested by the executing compiled external program (see FIG. 6, function 2(c) and corresponding text for processing details).

Figure 6:
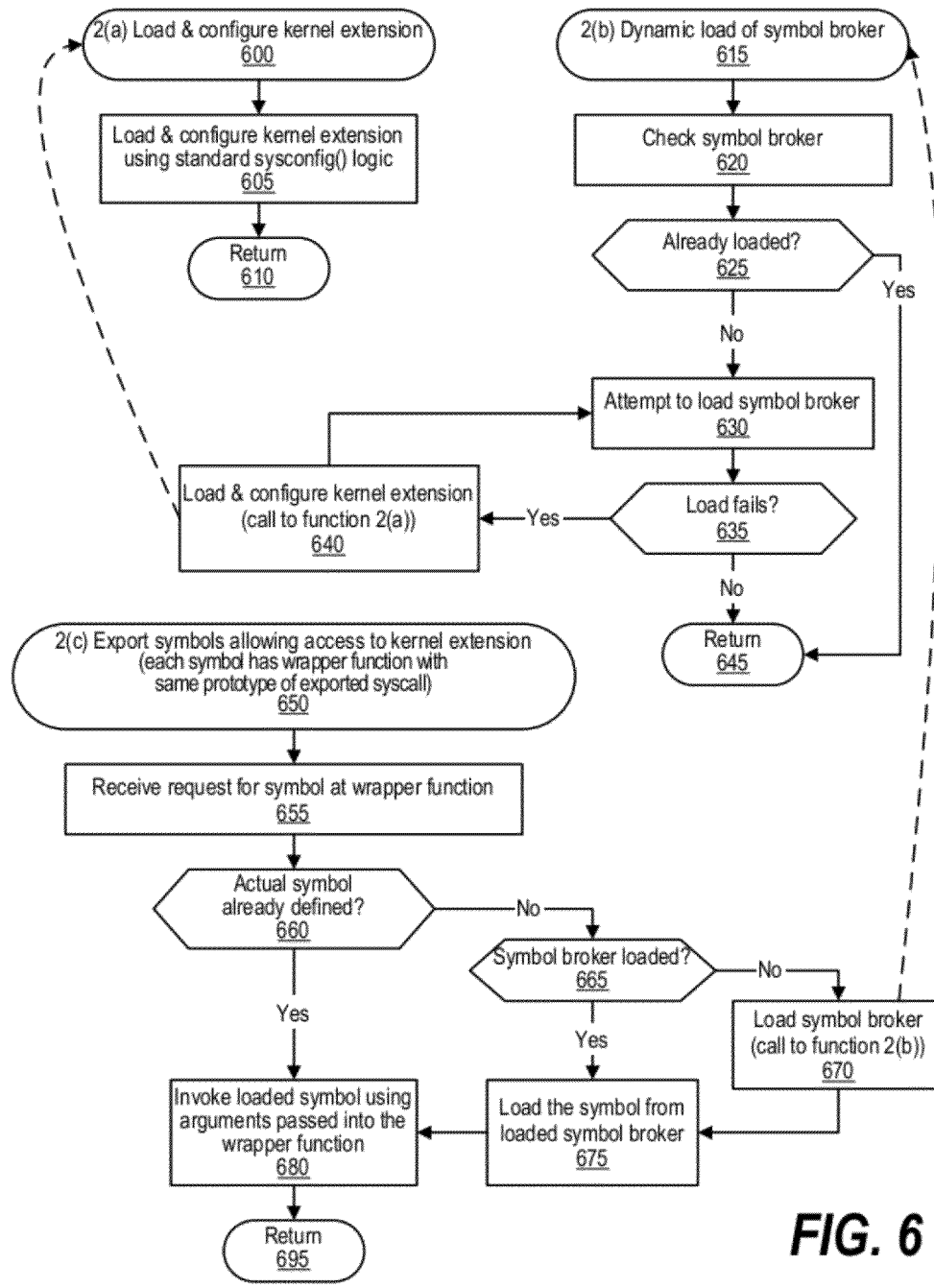
FIG. 6 is a flowchart showing the steps provided by various portions of the kernel extension loader library.

FIG. 6 is a flowchart showing the steps provided by various portions of the kernel extension loader library. Function 2(a) shows the steps taken to load and configure the kernel extension. Processing commences at 600 whereupon, at step 605, the kernel extension is loaded into kernel space and configured (e.g., using standard sysconfig( ) logic). Processing then returns to the calling routine at 610.

Function 2(b) shows the steps taken to dynamically load the symbol broker. Processing of this function commences at 615 whereupon, at step 620, the kernel extension loader library checks the user space for the symbol broker. A decision is made as to whether the symbol broker has already been loaded (decision 625). If the symbol broker has not yet been loaded, then decision 625 branches to the "no" branch whereupon, at step 630, the kernel extension loader library attempts to load the symbol broker. As previously described, the symbol broker has a loader table that indicates that the symbol broker is expecting to find the exported kernel extension symbols in kernel space. If these symbols are not present, the symbol library fails to load. A decision is made as to whether the symbol library fails to load (decision 635). If the symbol library fails to load, indicating that the kernel extension has not yet been loaded, then decision 635 branches to the "yes" branch whereupon, at step 640, the compiled kernel extension program is loaded into kernel space and processing loops back to retry loading the symbol broker at step 630 (which will be successful this time since the kernel extension has been loaded). When the load of the symbol broker does not fail, then decision 635 branches to the "no" branch whereupon processing returns to the calling routine at 645. Returning to decision 625, if the symbol broker has already been loaded, then decision 625 branches to the "yes" branch bypassing the remaining steps of function 2(b) and processing returns to the calling routine at 645.

Function 2(c) shows the steps taken by the kernel extension loader library to export symbols allowing access to symbols (e.g., functions, etc.) provided by the kernel extension by an executing compiled external program. In addition, function 2(c) transparently invokes the kernel extension symbol. Processing of function 2(c) commences at 650 whereupon, at step 655, the kernel extension loader library receives a request at the kernel extension loader library's wrapper function (the kernel extension loader library having previously exported defined callable symbols that correspond to the exported kernel extension symbols). A decision is made as to whether the actual kernel extension symbol that corresponds to the defined callable symbol has already been defined (decision 660).

If the actual symbol has not yet been defined, then decision 660 branches to the "no" branch whereupon a decision is made as to whether the symbol broker has already been loaded (decision 665). If the symbol broker has not yet been loaded, then decision 665 branches to the "no" branch whereupon, at step 670, the symbol broker is loaded by calling function 2(b), previously described above. If the symbol broker has already been loaded, then decision 665 branches to the "yes" branch bypassing step 670. At step 675, the actual kernel symbol is loaded from the symbol broker.

Returning to decision 660, if the actual kernel symbol has already been defined, then decision 660 branches to the "yes" branch bypassing steps 665 through 675. At step 680, the loaded kernel extension symbol (e.g., function, etc.) is transparently invoked using the arguments passed to the wrapper function at step 655. In addition, at step 680, the results returned by the kernel extension program are returned to the executing compiled external program. Processing then returns to the calling routine at 695.

FIG. 7 is a set of sample kernel extension files and a sample symbol broker. Kernel extension files 700 include kernel extension program 710, a sample of which is shown. Here, a kernel extension function (kxfunc) is declared and programmed to perform some useful function in kernel space. Kernel extension files 700 also include kernel export file 720 that notes the symbols (e.g., function names, etc.) found in the kernel extension program that are to be exported so they can be accessed by external programs. Here, the kernel extension function (kxfunc) declared in program file 710 is listed as an export symbol. Kernel extension files 700 also includes kernel extension makefile 730 that is used to compile the kernel extension program. Here, the source file (my_kernext.c) is compiled to create binary file my_kernext.

Symbol broker 750 has makefile 750 that imports the symbols exported from the kernel extension program and exports those same symbols. Here, the compiled version of the symbol broker is libshim.a. The libshim.a file has an associated loader table (not shown) that indicates the symbols that the libshim.a file expects to be present in kernel space when the libshim.a file is loaded. In this case, the symbol that libshim.a expects to be present upon being loaded is the kxfunc symbol (the function name exported from the kernel extension program).

Figure 8:
FIG. 8 is a set of sample kernel loader library files and a sample external (user space) program that references functionality provided by the kernel extension program.

FIG. 8 is a set of sample kernel loader library files and a sample external (user space) program that references functionality provided by the kernel extension program. Kernel extension loader library 800 has program file 810 that performs the kernel extension loader library functions. Here, the program file is named "wrappers.c" and has a single function (uxfunc) that corresponds to the function kxfunc that was introduced in kernel extension program 710. A pointer (*shimlibhandle) is declared. This will be the handle of the opened shim library (the symbol broker) when the symbol broker is loaded. Next, a function pointer is declared (kxfunchandle) with the same argument prototype as the kxfunc function that is found in the kernel extension program. Next, an attempt is made to load the symbol broker ("libshim.a"). Again, the loader table for libshim.a is expecting the symbol "kxfunc" to already exist in kernel space—if the kxfunc symbol does not exist an error occurs. A check is made as to whether the symbol broker (libshim.a) was loaded. If the symbol broker did not load, then the kernel extension ("my_kernext") is loaded using the sysconfig( ) function.

Once the kernel extension is loaded, the symbol broker (libshim.a) is loaded—this time the load will be successful because the kernel extension has been loaded. The function pointer to the exported function (kxfunc) is available from the symbol broker that has now been loaded. The function pointer (kxfunchandle) is set to the kxfunc function using the dlsym( ) function that obtains the address of a defined symbol within an object, in this case the object is the loaded symbol broker. Finally, the wrapper.c code calls the function using the function pointer (kxfunchandle) that points to the kxfunc function passing the function the arguments that were passed to the kernel extension loader library wrapper program by the compiled external program. In the sample, the arguments passed are (argument, argsize), however those skilled in the art will appreciate that essentially any arguments can be passed. In addition, the wrapper code returns the results back to the calling routine (the executing compiled external program). Moreover, it is not a strict requirement that the argument signature in the "wrapper function" (e.g., "uxfunc" in this example) exactly match that of the function found in the kernel extension (e.g., "kxfunc" in this example). In some environments, such as found in IBM's AIX™ brand operating system, sysconfig( ) dlopen( ) and dlsym( ) are standard functions provided by the operating system. The functions may be provided under these names or may be provided with alternate names.

Kernel extension loader library 800 has export file 820 that exports the symbols used in the kernel extension loader library. Here, the exported symbol is "uxfunc" which is a defined callable symbol that corresponds to the kernel extension program symbol "kxfunc" that was exported from the kernel extension program (see FIG. 7, kernel extension program 710 and kernel export file 720).

Kernel extension loader library 800 has makefile 830 that compiles the export file resulting in binary file libuser.a. Note that makefile 830 does not import the kernel export file (my_kernexp.exp) which was shown in FIG. 7, file 720. In addition, makefile 830 does not link the symbol broker (libshim.a).

User program 850 is an example of an external program (mywidget.c file 860) that, when compiled and linked with file 810 (wrapper.c, or with libshim.a) is able to utilize functionality from a kernel extension program that has not yet been loaded. Here, the external program calls uxfunc which is a defined callable symbol that was exported by the kernel extension loader library. When the statement "rc=uxfunc (buffer, bufsize)" is executed, the wrapper.c code is invoked and will dynamically load the kernel extension program, dynamically load the symbol broker, dynamically load the kernel exported symbol (kxfunc), and will transparently invoke the kernel function (kxfunc) passing it the arguments set as buffer, buffsize, and will return the result back to external program 860 (returning as "rc").

While particular embodiments of the present disclosure have been shown and described, it will be obvious to those skilled in the art that, based upon the teachings herein, that changes and modifications may be made without departing from this disclosure and its broader aspects. Therefore, the appended claims are to encompass within their scope all such changes and modifications as are within the true spirit and scope of this disclosure. Furthermore, it is to be understood that the disclosure is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

The invention claimed is:

1. A method implemented by an information handling system comprising:
    preparing a dynamically loaded kernel extension, wherein the preparing further comprises:
        compiling a kernel extension program that includes a symbol;
        exporting the symbol from the kernel extension program;
        compiling a symbol broker that references the exported symbol; and
        creating a kernel extension loader library with a defined callable symbol that corresponds to the exported symbol, wherein the kernel extension loader library is linked by an external program following compilation of the external program resulting in a compiled external program, and wherein the created kernel extension loader library dynamically loads the compiled kernel extension program, the compiled symbol broker, and the exported symbol when the defined callable symbol is referenced during execution of the compiled external program.

2. The method of claim 1 wherein the exported symbol and the defined callable symbol are each declared using a common function prototype.

3. The method of claim 1 wherein the creation of the extension loader library further comprises:
    determining whether the compiled symbol broker has been loaded;
    in response to the determination being that the compiled symbol library has not been loaded:
        loading the compiled kernel extension program;
        loading the compiled symbol broker; and
        loading the exported symbol by referencing the loaded compiled symbol library.

4. The method of claim 3 wherein the determining further comprises:
    attempting to load the compiled symbol broker, wherein the attempted load fails in response to the compiled kernel extension program being absent from a kernel space resulting in an absence of the exported symbol.

5. The method of claim 1 wherein the external program executes in a user-space with the linked in kernel extension loader library and wherein the kernel extension executes in a kernel-space.

6. The method of claim 1 further comprising:
    creating a wrapper function in the kernel extension loader library that corresponds to the defined callable symbol;
    exporting the defined callable symbol, wherein the external program references the defined callable symbol, wherein the loading, by the kernel extension loader library, of the compiled kernel extension program is performed in response to a first use of the defined callable symbol by the executing compiled external program;
    calling, by the kernel extension loader library, a kernel extension function included in the compiled kernel extension program and corresponding to the exported symbol, the calling resulting in one or more return values; and
    returning, by the kernel extension loader library, the return values to the executing compiled external program.

7. The method of claim 6 further comprising:
    receiving, at the kernel extension loader library, one or more arguments from the executing compiled external program when the executing compiled external program references the defined callable symbol, wherein the calling of the kernel extension function further comprises passing the received arguments to the kernel extension function.

8. The method of claim 7 further comprising:
    converting the one or more received arguments from an input data type to an expected data type, wherein the arguments that are passed to the kernel extension function are the converted arguments.

9. The method of claim 6 further comprising:
converting the one or more received return values from an input data type to an expected data type, wherein the return values that are returned to the executing compiled external program are the converted return values.

10. An information handling system comprising:
one or more processors;
a memory coupled to at least one of the processors;
a set of computer program instructions stored in the memory and executed by at least one of the processors in order to perform actions of:
preparing a dynamically loaded kernel extension, wherein the preparing further comprises:
compiling a kernel extension program that includes a symbol;
exporting the symbol from the kernel extension program;
compiling a symbol broker that references the exported symbol; and
creating a kernel extension loader library with a defined callable symbol that corresponds to the exported symbol, wherein the kernel extension loader library is linked by an external program following compilation of the external program resulting in a compiled external program, and wherein the created kernel extension loader library dynamically loads the compiled kernel extension program, the compiled symbol broker, and the exported symbol when the defined callable symbol is referenced during execution of the compiled external program.

11. The information handling system of claim 10 wherein the exported symbol and the defined callable symbol are each declared using a common function prototype.

12. The information handling system of claim 10 wherein the creation of the extension loader library causes at least one of the processors to perform additional actions comprising:
determining whether the compiled symbol broker has been loaded;
in response to the determination being that the compiled symbol library has not been loaded:
loading the compiled kernel extension program;
loading the compiled symbol broker; and
loading the exported symbol by referencing the loaded compiled symbol library.

13. The information handling system of claim 12 wherein the determining further comprises:
attempting to load the compiled symbol broker, wherein the attempted load fails in response to the compiled kernel extension program being absent from a kernel space resulting in an absence of the exported symbol.

14. The information handling system of claim 10 wherein the external program executes in a user-space with the linked in kernel extension loader library and wherein the kernel extension executes in a kernel-space.

15. The information handling system of claim 10 wherein at least one of the processors perform additional actions comprising:
creating a wrapper function in the kernel extension loader library that corresponds to the defined callable symbol;
exporting the defined callable symbol, wherein the external program references the defined callable symbol, wherein the loading, by the kernel extension loader library, of the compiled kernel extension program is performed in response to a first use of the defined callable symbol by the executing compiled external program;
calling, by the kernel extension loader library, a kernel extension function included in the compiled kernel extension program and corresponding to the exported symbol, the calling resulting in one or more return values; and
returning, by the kernel extension loader library, the return values to the executing compiled external program.

16. The information handling system of claim 15 wherein at least one of the processors perform additional actions comprising:
receiving, at the kernel extension loader library, one or more arguments from the executing compiled external program when the executing compiled external program references the defined callable symbol, wherein the calling of the kernel extension function further comprises passing the received arguments to the kernel extension function; and
converting the one or more received arguments from an input data type to an expected data type, wherein the arguments that are passed to the kernel extension function are the converted arguments.

17. The information handling system of claim 15 wherein at least one of the processors perform additional actions comprising:
converting the one or more received return values from an input data type to an expected data type, wherein the return values that are returned to the executing compiled external program are the converted return values.

18. A computer program product stored in a computer readable storage medium, comprising computer program code that, when executed by an information handling system, causes the information handling system to perform actions comprising:
preparing a dynamically loaded kernel extension, wherein the preparing further comprises:
compiling a kernel extension program that includes a symbol;
exporting the symbol from the kernel extension program;
compiling a symbol broker that references the exported symbol; and
creating a kernel extension loader library with a defined callable symbol that corresponds to the exported symbol, wherein the kernel extension loader library is linked by an external program following compilation of the external program resulting in a compiled external program, and wherein the created kernel extension loader library dynamically loads the compiled kernel extension program, the compiled symbol broker, and the exported symbol when the defined callable symbol is referenced during execution of the compiled external program.

19. The computer program product of claim 18 wherein the exported symbol and the defined callable symbol are each declared using a common function prototype.

20. The computer program product of claim 18 wherein the creation of the extension loader library further comprises additional computer program code that, when executed by the information handling system, causes the information handling system to perform additional actions comprising:
determining whether the compiled symbol broker has been loaded;
in response to the determination being that the compiled symbol library has not been loaded:
loading the compiled kernel extension program;
loading the compiled symbol broker; and loading the exported symbol by referencing the loaded compiled symbol library.

21. The computer program product of claim 20 wherein the determining further comprises additional computer program code that, when executed by the information handling system, causes the information handling system to perform additional actions comprising:

attempting to load the compiled symbol broker, wherein the attempted load fails in response to the compiled kernel extension program being absent from a kernel space resulting in an absence of the exported symbol.

22. The computer program product of claim 18 wherein the external program executes in a user-space with the linked in kernel extension loader library and wherein the kernel extension executes in a kernel-space.

23. The computer program product of claim 18 further comprising:

creating a wrapper function in the kernel extension loader library that corresponds to the defined callable symbol;

exporting the defined callable symbol, wherein the external program references the defined callable symbol, wherein the loading, by the kernel extension loader library, of the compiled kernel extension program is performed in response to a first use of the defined callable symbol by the executing compiled external program;

calling, by the kernel extension loader library, a kernel extension function included in the compiled kernel extension program and corresponding to the exported symbol, the calling resulting in one or more return values; and returning, by the kernel extension loader library, the return values to the executing compiled external program.

24. The computer program product of claim 23 further comprising additional computer program code that, when executed by the information handling system, causes the information handling system to perform additional actions comprising:

receiving, at the kernel extension loader library, one or more arguments from the executing compiled external program when the executing compiled external program references the defined callable symbol, wherein the calling of the kernel extension function further comprises passing the received arguments to the kernel extension function; and converting the one or more received arguments from an input data type to an expected data type, wherein the arguments that are passed to the kernel extension function are the converted arguments.

25. The computer program product of claim 23 further comprising additional computer program code that, when executed by the information handling system, causes the information handling system to perform additional actions comprising:

converting the one or more received return values from an input data type to an expected data type, wherein the return values that are returned to the executing compiled external program are the converted return values.

* * * * *